United States Patent
Pöllänen et al.

(10) Patent No.: US 6,859,374 B2
(45) Date of Patent: Feb. 22, 2005

(54) METHOD IN CONNECTION WITH CONVERTER BRIDGES

(75) Inventors: Riku Pöllänen, Lappeenranta (FI); Antti Tarkiainen, Lappeenranta (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/459,721

(22) Filed: Jun. 12, 2003

(65) Prior Publication Data

US 2004/0032755 A1 Feb. 19, 2004

(30) Foreign Application Priority Data

Jun. 13, 2002 (FI) .............................................. 20021144

(51) Int. Cl.$^7$ .............................................. H02M 7/17
(52) U.S. Cl. ...................................................... 363/69
(58) Field of Search .............................. 363/65, 67, 69

(56) References Cited

U.S. PATENT DOCUMENTS 5,657,217 A * 8/1997 Watanabe et al. ............. 363/71

OTHER PUBLICATIONS

Ogasawara, Satoshi et al., *A Novel Control Scheme of a Parallel Current–Controlled PWM Inverter*, IEEE Transactions on Industry Appln., vol. 28, No. 5, Sep./Oct. 1992, pp. 1023–1030.

Ye, Zhihong et al., *Control of Circulating Current in Parallel Three–Phase Boost Rectifiers*, Center for Power Electronics Systems (CPES), Virginia Polytechnic Institute and State University, pp. 506–512.

* cited by examiner

*Primary Examiner*—Adolf Berhane
(74) *Attorney, Agent, or Firm*—Dykema Gossett PLLC

(57) ABSTRACT

A method in connection with converter bridges connected in parallel, whereby the converter bridges are directly connected in parallel and the converter bridges are controlled independently on the basis of control variables, the method comprising the steps of controlling the converter bridges to produce an output switching vector on the basis of the control variables, determining the magnitude of a common-mode current component of the converter bridges, and selecting a zero vector to be used during control as a switching vector on the basis of the sign of the common-mode current component to minimize common-mode current of the converter bridges.

4 Claims, 3 Drawing Sheets

METHOD IN CONNECTION WITH CONVERTER BRIDGES

BACKGROUND OF THE INVENTION

The present invention relates to a method in connection with converter bridges connected in parallel, whereby the converter bridges are directly connected in parallel and the converter bridges are controlled independently on the basis of control variables, the method comprising a step of controlling the converter bridges to produce an output switching vector on the basis of the control variables.

Converter bridges implemented with IGB transistors are used in modern electric drives both as motor converters and network converters. Network converters are typically used when a drive must have four-quadrant operation. The power range of converters used is wide, varying from a few dozens of kilowatts to several megawatts. Although current-carrying capacities and maximum voltages of IGB transistors have risen continuously, power stages must still be connected in parallel when high power is used in order to secure the current-carrying capacity of transistors. It is also possible to have a redundant parallel connection, which aims at improving the usability of an electric drive and securing the continuity of operation also when a converter bridge or a few converter bridges fail.

Previously, converter bridges controlled on the basis of a principle of direct torque control (DTC) could be connected in parallel in both motor and network converter applications by utilizing synchronized transistor control shown in FIG. 1, i.e. by copying switching instructions given by one control card to all parallel power stages. In such a case, electrical properties of semi-conductor power switches must be as similar as possible so that the currents would be distributed evenly between the parallel transistors. It is often difficult and cumbersome to find components that are sufficiently alike. In addition, if a control card 1 fails, the entire system does not function any more. Therefore, it is also impossible to implement a redundant parallel connection by using the principle of FIG. 1. Another disadvantage of the solution is that a fully modular design of the system is not possible.

In case of network converters, another alternative has been that a galvanic isolation, i.e. a supply transformer with several three-phase secondary windings, is used on the side of a supplying alternating-current network as in FIG. 2. Such a supply transformer is, however, very expensive and a large separate component.

In motor applications, a method corresponding to FIG. 2 is to use a motor with three-phase stator windings the number of which corresponds to parallel motor converter units. The galvanic isolation of the solution thus requires a specially-built, expensive motor. A redundant parallel connection by using the solution of FIG. 2 is not economically reasonable, because each unit, depending on the application, requires its own secondary windings in a supply transformer or stator windings in a motor.

The publication Ogasawara S., Takagaki J., Akagi H., Nabae A., "A Novel Control Scheme of a Parallel Current Controlled PWM Inverter", *IEEE Transactions on Industry Applications*, Vol. 28, No. 5, September/October, 1992, pages 1023–1030, discloses a method for parallel connection of motor converters, based on the use of current balancing chokes, the method being not applied in connection with direct torque control, however.

The publication Ye Z., Boroyevich D., Choi J-Y., Lee F. C., "Control of Circulating Current in Parallel Three-Phase Boost Rectifiers", Record of APEC 2000 Conference, Vol. 1, 2000, pages 506–512, describes a method for controlling circulating current in converter bridges connected in parallel and using a pulse-width modulation (PWM) modulator, the method being not applicable in connection with DTC control, however.

BRIEF DESCRIPTION OF THE INVENTION

It is an object of the present invention to provide a method avoiding the above mentioned disadvantages and allowing a direct parallel connection of converter bridges with voltage intermediate circuits and applying a direct torque control so that no additional passive components, galvanic isolation nor synchronized control of power switches are required. The object is achieved by a method of the invention, characterized in that the method also comprises the steps of determining the magnitude of a common-mode current component of the converter bridges, and selecting a zero vector to be used during control as a switching vector on the basis of the sign of the common-mode current component to minimize common-mode current of the converter bridges.

The method of the invention is based on the idea that by selecting the zero vector to be used in controlling the converter bridges from two possible vectors, the common-mode current can be minimized.

The method of the invention allows a fully modular design and manufacture of converter bridges, and it can be applied to parallel connections of network converters and motor converters.

In the method of the invention, a common-mode current component circulating via parallel-connected converter bridges and their direct-voltage intermediate circuit, i.e. circulating current, is actively controlled. Because of the method, no special control or filter solutions nor any supply transformers or motors with special structures are required to connect the converter bridges in parallel. By applying the method of the invention, the parallel connection of converter bridges does not substantially distort the curve form of converters' current. Also current stresses of transistors, caused by circulating currents, are kept under control.

BRIEF DESCRIPTION OF THE FIGURES

In the following, the invention will be described in greater detail in connection with preferred embodiments, with reference to the attached drawings, in which.

DETAILED DESCRIPTION OF THE INVENTION

Figure 1:
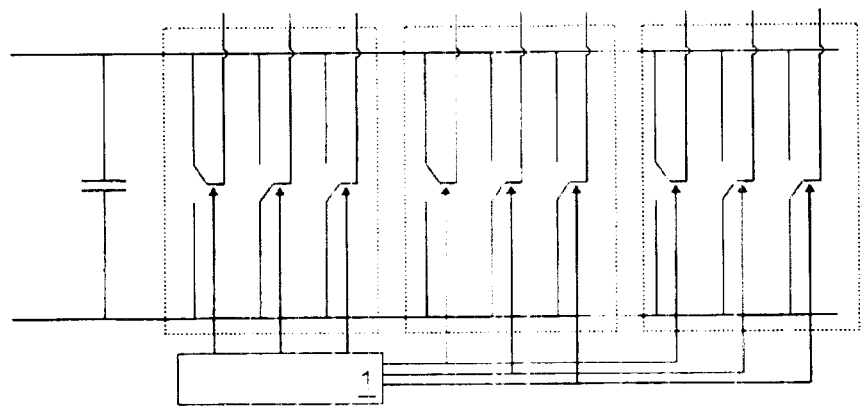
FIGS. 1 and 2 show prior art solutions.
Figure 2:
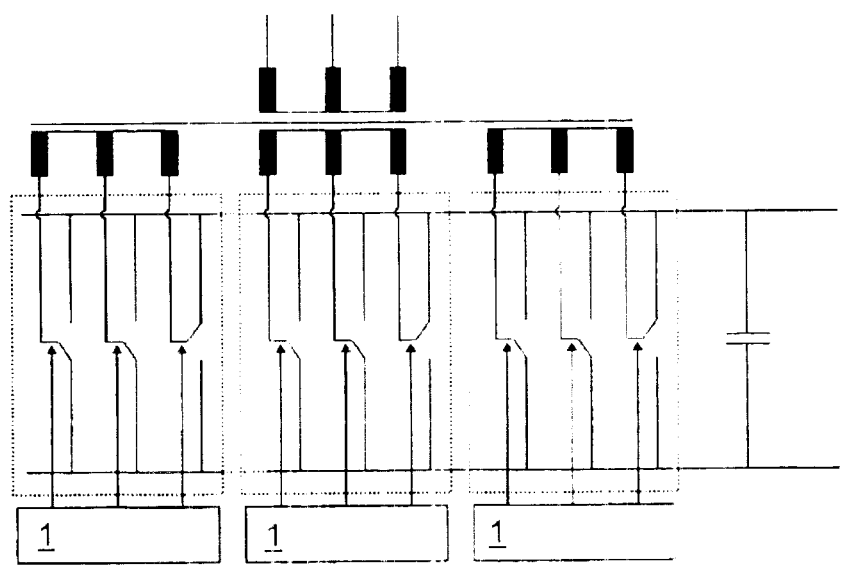
Figure 3:
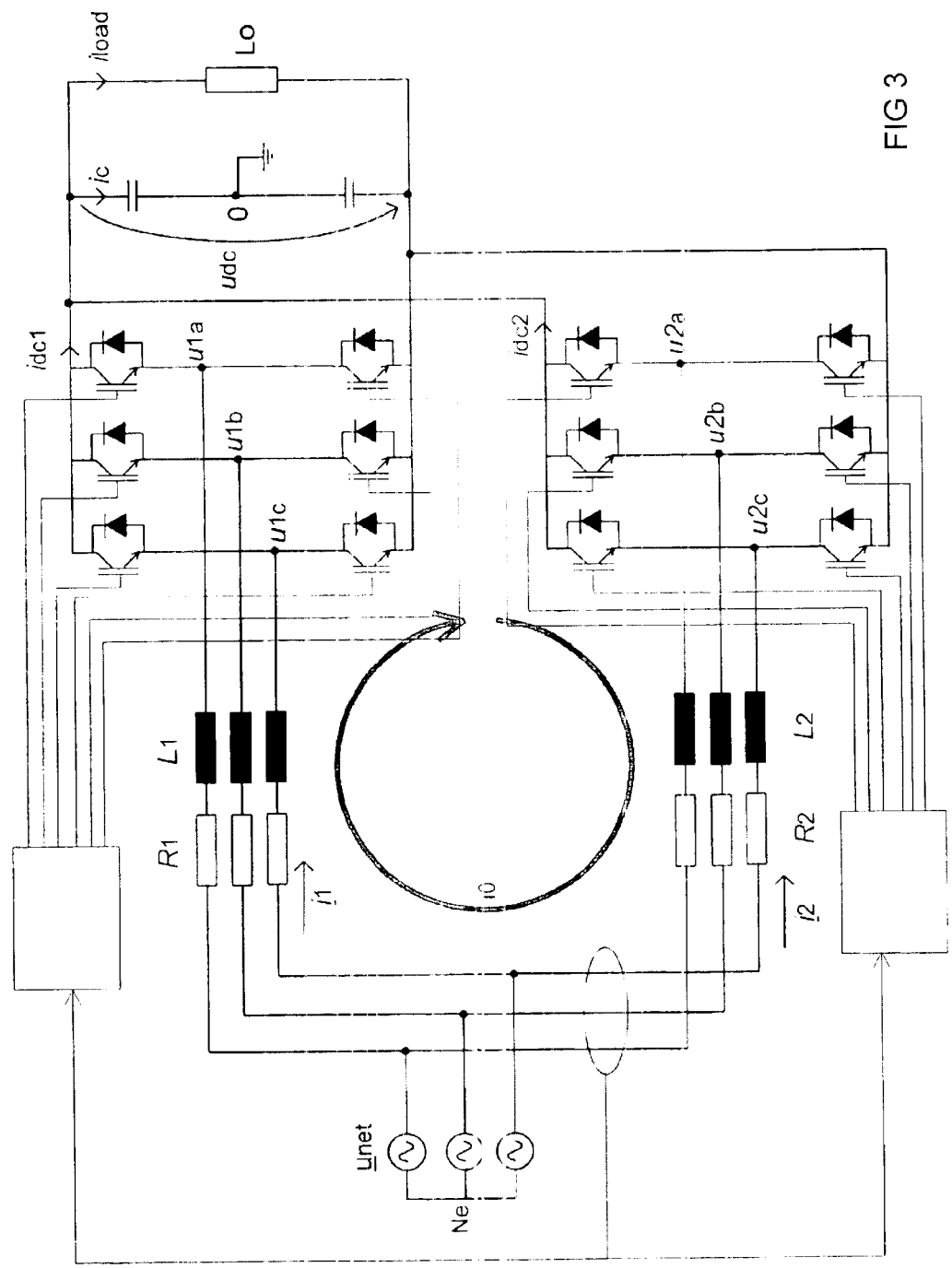
FIG. 3 shows a main circuit of two network converters connected in parallel.

FIG. 3 shows a main circuit diagram of equipment implementing the method of the invention. In this figure, two converter bridges are connected in parallel and both converter bridges are controlled by using a separate control unit not shown in the figure. FIG. 3 shows two converter bridges connected in parallel, but the invention can also be applied in connection with several converter bridges connected in parallel. In addition, the converter circuit of FIG. 3 is illustrated particularly as a network converter allowing the power to be transferred both to a load Lo, which is directly connected to a direct-voltage intermediate circuit $u_{dc}$ in the figure, and to a supplying network Ne, which is shown in a form of three star-connected voltage sources in the figure. FIG. 3 also shows resistances $R_1$, $R_2$ and inductances $L_1$, $L_2$ connected to the main circuit of the converters. These resistances and inductances can be, for instance, electrical properties of network filters used in connection with network converters.

To understand the method of the invention, the parallel connection of FIG. 3 should be examined mathematically. A phase-specific switching function $sw_i$ can be determined for a converter, whereby $$sw_i = \begin{cases} +1/2, \text{ when phase } i \text{ is connected} \\ \quad \text{to positive bar of direct}-\text{voltage intermediate circuit} \\ -1/2, \text{ when phase } i \text{ is connected to} \\ \quad \text{negative bar of direct}-\text{voltage intermediate circuit} \end{cases} \quad (1)$$

$i = a, b, c.$

The space vector of the switching function, i.e. the switching vector $\underline{sw}$, and the zero-sequence component $sw_0$ can thus be calculated with equations $$\underline{sw} = \frac{2}{3}\left(sw_a + sw_b e^{j\frac{2\pi}{3}} + sw_c e^{j\frac{4\pi}{3}}\right) \quad (2)$$

and $$sw_0 = \frac{1}{3}(sw_a + sw_b + sw_c). \quad (3)$$

The voltage vector $\underline{u}$ of the converter and the zero-sequence component $u_0$ of the voltage can now be presented by means of the switching vector and its zero-sequence component and by means of the direct voltage $u_{dc}$ of the intermediate circuit $$\underline{u} = \underline{sw} u_{dc} \quad (4)$$

and $$u_0 = sw_0 u_{dc}. \quad (5)$$

On the basis of the equations (2) to (5), a switching vector $\underline{sw}$, a zero-sequence component $sw_0$, a voltage vector $\underline{u}$ of a converter and a zero-sequence component of the voltage $u_0$ can be calculated for each switch combination of a converter. Table 1 shows the values for switching vectors and zero-sequence components of the switching vectors when different switch combinations are used. The table shows that a zero-sequence component of a switching vector and thus also a zero-sequence component of the voltage of a converter may obtain four different values, i.e. −½, −⅙, ⅙ and ½. The amplitude of the zero-sequence component is at its highest when the voltage vector $\underline{u}_0$ or $\underline{u}_7$ is switched, whereby the amplitudes of the zero-sequence component $sw_0$ are −½ and ½ according to Table 1.

TABLE 1

| $sw_a$ | $sw_b$ | $sw_c$ | sw | $sw_0$ | u |
|---|---|---|---|---|---|
| −1/2 | −1/2 | −1/2 | 0 | −1/2 | $u_0$ |
| 1/2 | −1/2 | −1/2 | $2/3e^{j0\pi/3}$ | −1/6 | $u_1$ |
| 1/2 | 1/2 | −1/2 | $2/3e^{j1\pi/3}$ | 1/6 | $u_2$ |
| −1/2 | 1/2 | −1/2 | $2/3e^{j2\pi/3}$ | −1/6 | $u_3$ |

TABLE 1-continued

| $sw_a$ | $sw_b$ | $sw_c$ | sw | $sw_0$ | u |
|---|---|---|---|---|---|
| −1/2 | 1/2 | 1/2 | $2/3e^{j3\pi/3}$ | 1/6 | $u_4$ |
| −1/2 | −1/2 | 1/2 | $2/3e^{j4\pi/3}$ | −1/6 | $u_5$ |
| 1/2 | −1/2 | 1/2 | $2/3e^{j5\pi/3}$ | 1/6 | $u_6$ |
| 1/2 | 1/2 | 1/2 | 0 | 1/2 | $u_7$ |

Phase-specific voltage equations of the parallel circuit of the two converter bridges shown in FIG. 3 are $$sw_{2a}u_{dc} + R_2 i_{2a} + L_2 \frac{di_{2a}}{dt} - R_1 i_{1a} + L_1 \frac{di_{1a}}{dt} - sw_{1a}u_{dc} = 0, \quad (6)$$

$$sw_{2b}u_{dc} + R_2 i_{2b} + L_2 \frac{di_{2b}}{dt} - R_1 i_{1b} + L_1 \frac{di_{1b}}{dt} - sw_{1b}u_{dc} = 0, \quad (7)$$

$$sw_{2c}u_{dc} + R_2 i_{2c} + L_2 \frac{di_{2c}}{dt} - R_1 i_{1c} + L_1 \frac{di_{1c}}{dt} - sw_{1c}u_{dc} = 0, \quad (8)$$

and, by using the markings of FIG. 3, the equation for circulating current, i.e. the zero-sequence component $i_0$ of the currents of the converter bridges, is $$i_0 = \frac{1}{3}(i_{1a} + i_{1b} + i_{1c}) = i_{01} = -i_{02} = -\frac{1}{3}(i_{2a} + i_{2b} + i_{2c}), \quad (9)$$

where the subindices 01 and 02 refer to common-mode current components of the upper and the lower converter.

Phase-specific switching functions can be presented as the sum of a differential-mode and common-mode parts $$sw_a = sw'_a + sw_0, \; sw_b = sw'_b + sw_0 \text{ and } sw_c = sw'_c + sw_0, \quad (10)$$

where the sum of the differential-mode components is zero, i.e. $sw'_a + sw'_b + sw'_c = 0$. Further, by partly adding the sides of the equations (6) to (8) together and taking the equations (9) and (10) into account, the model for the zero-sequence system of the parallel connection of FIG. 3 is obtained $$(sw_{02} + sw_{01})u_{dc} - (R_1 + R_2)i_0 - (L_1 + L_2)\frac{di_0}{dt} = 0. \quad (11)$$

Figure 4:
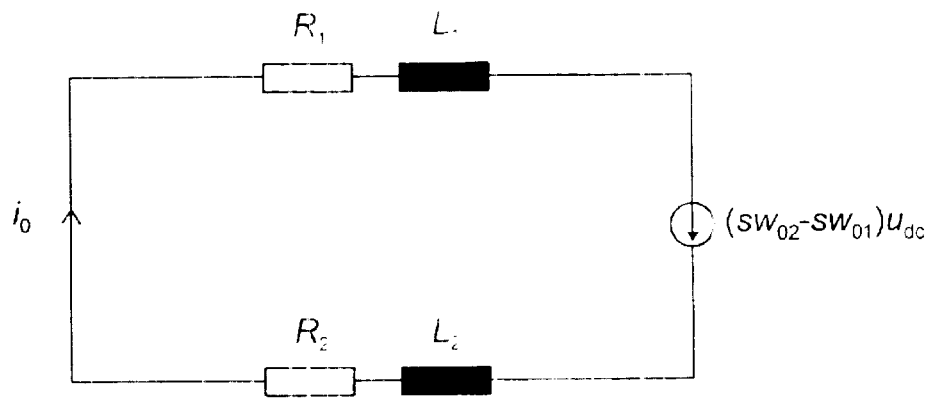
FIG. 4 shows an equivalent circuit of the system of FIG. 3 for common-mode current.

The equivalent parallel connection of the zero-sequence system, corresponding to the equation 11, is shown in FIG. 4. The equivalent parallel connection of FIG. 4 can also be applied to an LCL type of network filter. Thus, $L_1$ of the equation (11) and of FIG. 4 is the sum of inductances of an LCL filter of the converter 1 and, correspondingly, $L_2$ is the sum of inductances of an LCL filter of the converter 2. Capacitors connected to a delta or a floating star point of the LCL filter do not affect the zero-sequence system, since it is known that they do not form a path for common-mode current.

Figure 5:
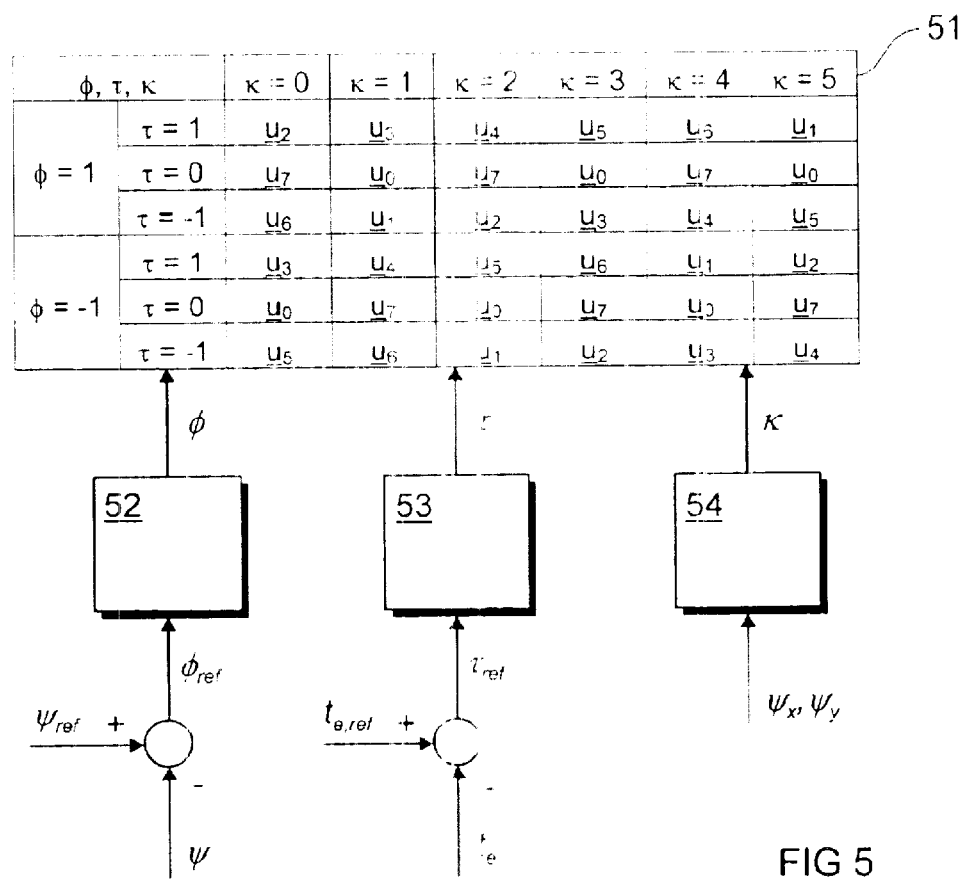
FIG. 5 shows an optimum switching table employed in a method based on direct torque control.

In a control method based on direct torque control, an optimum switching table and logic variables required for this table are utilized for forming output voltage instructions of a converter, as shown in FIG. 5. The optimum switching table 51 is a table which comprises, for each different combination of incoming logic variables, information on how to form output voltages of the converter. The logic variables κ, φ, τ are formed by comparing the estimated actual values with reference variables. The block 54 of FIG. 5 is a sector selector determining the position angle of the estimated flux vector and producing the logic variable κ as its output. The estimated flux vector is shown in its component form $\psi_x$, $\psi_y$ in FIG. 5. Thus, the value of the variable κ changes when the flux vector proceeds from one circular section to another. In the case shown, the logic variable κ of the sector selector can obtain six different values, whereby the flux circle is divided correspondingly into six different sectors.

The logic variable φ affects the magnitude of the stator flux linkage of an electric machine. The variable can obtain two different values describing the need for either increasing or reducing the flux magnitude. Block 52 estimating the need for changing the flux magnitude obtains as input a reference variable $\phi_{ref}$, which describes the actual value ψ for the magnitude of the stator flux linkage compared with the value $\psi_{ref}$ for the desired flux. Correspondingly, the logic variable τ can obtain three different values. The variable τ describes the need for increasing, reducing or maintaining the torque produced by an electric machine. As its input, block 53 estimating the need for changing the torque obtains a reference value $\tau_{ref}$ for torque, representing the relation of the torque $t_e$ produced by the electric machine to the desired torque $t_{e,ref}$. Blocks 52 and 53 thus act as hysteresis comparators, which define the need for changing their output state on the basis of an incoming signal. The three above-mentioned three logic variables κ, φ, τ are brought to an optimum switching table, which, on the basis of said variables, determines the switching vector for the inverter.

The above-mentioned variables of the optimum switching table are described in connection with a motor converter, whereby the load of the converter is a motor. In this case, an electric model of the motor is made, which is used for estimating the above actual values. In the methods based on direct torque control, the only direct measurement of the process is when the current magnitude is determined.

In case of a network converter, properties of a supplying network can be used in a manner known per se as variables of an optimum switching table, as was presented above. A derived flux linkage vector of a network inverter can thus be calculated by using a voltage integral $$\overline{\psi} = \int \overline{u} dt, \quad (12)$$

and the torque proportional to the power to be transferred can be calculated by the cross product of the current vector determined by measuring and the flux linkage vector $$t_c = |\overline{\psi} \times \overline{i}|. \quad (13)$$

The torque reference $t_{e,ref}$ can be produced on the basis of the difference between the intermediate-circuit voltage reference and the intermediate-circuit voltage measured by means of an intermediate-circuit voltage controller, for instance.

The reference $\psi_{ref}$ of the absolute value for the flux linkage is formed, for instance, by means of a reactive-power controller by comparing the estimated reactive power $q_{est}$ with the reactive-power reference $q_{ref}$. In connection with network inverters, a low-pass filter is typically used between the inverter and the network. If the filter is of the L filter type, the following equation can be used for estimating the idle power:

$$q_{est} = (\overline{\psi}_v \cdot \overline{i}) \omega, \quad (14)$$

where ω is the electrical angular frequency corresponding to the fundamental wave of the network and $\overline{\psi}_v$ is the flux linkage vector of the network. The flux linkage vector of the network is estimated by using the equation $$\overline{\psi}_v = \overline{\psi} - L\overline{i}, \quad (15)$$

where L is the inductance of the network filter.

By means of the presented equations (12) to (15), network properties can be determined such that a method based on direct torque control is simple to use also in connection with a network inverter.

According to the method of the invention, converter bridges connected in parallel are controlled independently on the basis of control variables, whereby the method comprises the steps of controlling the converter bridges so that they produce an output switching vector on the basis of the control variables. As shown above, the output switching vector corresponding to a specific switching combination of converter bridge switches is formed on the basis of the optimum switching table. Table 1 shows potential switch combinations in connection with a three-phase system. Eight output switching vectors are thus formed. Two of these eight switching vectors sw obtain the value zero, and these two vectors are called zero vectors. In accordance with Table 1, the voltage vectors $\underline{u}_0$ and $\underline{u}_7$ of the converter correspond to the zero vectors. As the table shows, all bridge switches are thus switched to either the positive voltage ($\underline{u}_7$) or negative voltage ($\underline{u}_0$) of the voltage intermediate circuit. Since the switch pairs form an output for one converter phase in the manner shown in FIG. 3, the converter phases are shorted out in said cases and the current caused by differential-mode voltage does not pass through the intermediate circuit. Common-mode current, on the other hand, can pass through the direct-voltage intermediate circuit, if the common-mode voltages of the parallel converter bridges are different, because the parallel-connected converter bridges form a closing current path for the current, as shown in FIG. 3.

In the method of the invention, the magnitude of common-mode current of converter bridges is determined. It is determined preferably so that the magnitude of phase currents of the bridges is measured. If the sum of the phase currents differs from zero, common-mode current is flowing. In a three-phase system, such as in a motor, the voltage is usually supplied to the stator of the motor, in which the other ends of the windings are connected together. The sum of the phase currents is thus zero, if potential capacitive leakage currents are not taken into account. In such a case, the measuring of the current of two phases is sufficient for determining the current of the third phase. In the method of the invention, however, phase currents must be determined by measuring the current of each phase independently.

Common-mode current can thus be determined by summing the phase currents. Another alternative for determining the magnitude of the current is to form a separate current transformer, the primary circuit of which is formed of all converter phases. The magnitude of summation current, i.e. common-mode current, is obtained from the secondary of such a transformer. A third alternative for determining the magnitude of common-mode current is to measure the current of two phases and the currents of the bars of the direct-voltage intermediate circuit either separately or together by using a common current transformer.

As described above and shown in FIG. 5, the logic variable τ is used for selecting whether a voltage vector increasing, decreasing or maintaining the torque (in connection with a motor converter) or the intermediate-circuit voltage (in connection with a network converter) is switched to the converter output. If the variable τ obtains the value 0, the torque need not be increased at that moment.

In the method known per se and based on direct torque control, when the logic variable τ depending on the actual value and set value of the torque obtains the value 0, a zero vector is selected at the converter output. Which one of the two possible zero vectors is selected, depends on the preceding, active vector in such a manner that when one switches to a zero vector, the switch state of only one bridge is changed. When the voltage vectors are determined as in Table 1, one switches from the voltage vectors $\underline{u}_1$, $\underline{u}_3$ and $\underline{u}_5$ to the zero vector $\underline{u}_0$. Correspondingly, one switches from the voltage vectors $\underline{u}_2$, $\underline{u}_4$ and $\underline{u}_6$ to the zero vector $\underline{u}_7$ according to the known control method.

In the method of the invention, a zero vector to be used during control as a switching vector is selected on the basis of the sign of the common-mode current component to minimize the common-mode current of the converter bridges. As to the differential-mode variables, the zero vectors are equal in value, which means that in active-power and reactive-power transfer it is of little significance, which zero vector is used. However, the zero-sequence components of the converter voltage, associated with different zero vectors, are different and their amplitudes are much higher than the zero-sequence components of other voltage vectors, which can be observed on the basis of the previous mathematical examination.

Table 1 shows that the amplitudes of the zero-sequence components of the parallel active voltage vectors are equally high but opposite in sign. In the conventional method based on direct torque control, approximately the same number of parallel active voltage vectors are switched per one voltage sector. Thus, common-mode current caused by the active voltage vectors is zero on average. This means that common-mode current passing between the converter bridges can be affected in the manner of the invention by the selection of zero vectors.

Common-mode current is minimized, if the zero vector to be switched is selected according to the invention on the basis of the zero-sequence component of the current, i.e. common-mode current, in the following manner:

When $i_0 > 0$, zero vector $\underline{u}_0$ (---) is selected $i_0 < 0$, zero vector $\underline{u}_0$ (+++) is selected    (16)

When the zero vector is selected according to the invention by using the equation (16), the term $(sw_{02} - sw_{01})$ of the equation (11) obtains the value +1 or −1, depending on the sign of the common-mode current of the converter. In accordance with the invention, circulating current $i_0$ is thus always set towards zero because circulating current and its derivative are opposite in sign. This can be demonstrated by inserting $(sw_{02} - sw_{01}) = -1$ to the equation (11) when $i_0$ circulates in the positive direction, i.e. clockwise in FIG. 3, and inserting $(sw_{02} - sw_{01}) = 1$ when the direction of circulation of $i_0$ is negative. The results of the insertions can be combined as one equation $$(L_1 + L_2)\frac{di_0}{dt} = -\text{sgn}(i_0)[u_{dc} + (R_1 + R_2)|i_0|], \quad (17)$$

which indicates that by using the method of the invention, circulating current is always set towards zero when the vector to be switched is selected according to the equation (16).

The invention is described above in association with a control method based on direct torque control. It is, however, obvious that converter bridges can be controlled by using various methods. The invention can be applied to a method in which the switch position of the converter output is selected on the basis of control variables and in which converter bridges are connected in parallel. Consequently, by selecting the zero vector in accordance with the invention, the magnitude of the common-mode component of current can be minimized independently of the actual control method of the converter bridge.

It is obvious to a person skilled in the art that the basic idea of the invention can be implemented in various ways. The invention and its embodiments are thus not restricted to the above examples but they may vary within the scope of the claims.

What is claimed is:

1. A method in connection with converter bridges connected in parallel, whereby the converter bridges are directly connected in parallel and the converter bridges are controlled independently on the basis of control variables, the method comprising the steps of controlling the converter bridges to produce an output switching vector on the basis of the control variables, determining the magnitude of a common-mode current component of the converter bridges, and selecting a zero vector to be used during control as a switching vector on the basis of the sign of the common-mode current component to minimize common-mode current of the converter bridges.

2. A method as claimed in claim 1, wherein the converter bridges are controlled by means of a method based on direct torque control, whereby an electric model of the load of the converter bridges is formed, a flux linkage vector is estimated on the basis of the electric model, torque is estimated on the basis of the electric model, and the switching vectors of the converter bridges are determined on the basis of the set value for the torque, the estimated value for the torque, the set value for the absolute value of the flux linkage vector and the estimated flux linkage vector.

3. A method as claimed in claim 1, wherein the determination of the magnitude of the common-mode current component comprises a step of determining the magnitude of currents of all phases of the converter bridges and summing the current magnitudes together to achieve the magnitude of the common-mode current.

4. A method as claimed in claim 2, wherein the determination of the magnitude of the common-mode current component comprises a step of determining the magnitude of currents of all phases of the converter bridges and summing the current magnitudes together to achieve the magnitude of the common-mode current.

* * * * *